US009095856B2

(12) United States Patent
Maier et al.

(10) Patent No.: US 9,095,856 B2
(45) Date of Patent: Aug. 4, 2015

(54) SEPARATOR FLUID COLLECTOR AND METHOD

(75) Inventors: William C. Maier, Almond, NY (US); Gocha Chochua, Sugar Land, TX (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/574,222

(22) PCT Filed: Feb. 3, 2011

(86) PCT No.: PCT/US2011/023593
§ 371 (c)(1),
(2), (4) Date: Oct. 8, 2012

(87) PCT Pub. No.: WO2011/100158
PCT Pub. Date: Aug. 8, 2011

(65) Prior Publication Data
US 2013/0048577 A1 Feb. 28, 2013

Related U.S. Application Data

(60) Provisional application No. 61/303,273, filed on Feb. 10, 2010.

(51) Int. Cl.
*B04B 11/02* (2006.01)
*B04B 11/06* (2006.01)
(Continued)

(52) U.S. Cl.
CPC .............. *B04B 5/12* (2013.01); *B01D 17/0217* (2013.01); *B01D 19/0057* (2013.01);
(Continued)

(58) Field of Classification Search
CPC .......... B01D 17/0217; B01D 19/0057; B01D 21/262; B01D 45/14; B04B 1/00; B04B 1/10; B04B 1/12; B04B 5/005; B04B 5/12; B04B 11/02; B04B 11/06; B04B 2001/2091
USPC .................. 55/404–408, 306–307, 392–398, 55/416–416, 424, 426, 439; 95/270; 415/169.2, 169.4
See application file for complete search history.

(56) References Cited

U.S. PATENT DOCUMENTS 815,812 A 3/1906 Gow
819,207 A * 5/1906 Musnicki ....................... 206/240
(Continued)

FOREIGN PATENT DOCUMENTS

AU 2005282269 9/2005
CA 2578262 9/2005
(Continued)

OTHER PUBLICATIONS

Bi-Phase Rotary Separator Turbine, Multiphase Power & Processing Technologies LLC Technical literature (available at http://www.mpptech.com/techppp/pdfs/Bi-Phase.pdf).
(Continued)

*Primary Examiner* — David C Mellon
(74) *Attorney, Agent, or Firm* — Edmonds & Nolte, PC

(57) ABSTRACT

A collection apparatus for a separator. The collection apparatus including a housing at least partially encircling a flow separation passage and defining a chamber and a cutout, the chamber being in fluid communication with the flow separation passage to receive a separated flow therefrom, and the cutout extending outward from the chamber to at least partially deflect the separated flow.

11 Claims, 4 Drawing Sheets

(51) Int. Cl.

| | |
|---|---|
| *B04B 5/12* | (2006.01) |
| *B04B 1/00* | (2006.01) |
| *B01D 17/038* | (2006.01) |
| *B01D 19/00* | (2006.01) |
| *B01D 21/26* | (2006.01) |
| *B01D 17/02* | (2006.01) |
| *B01D 45/14* | (2006.01) |
| *B04B 1/20* | (2006.01) |

(52) U.S. Cl.
CPC ............ *B01D 21/262* (2013.01); *B01D 45/14* (2013.01); *B04B 1/00* (2013.01); *B04B 11/02* (2013.01); *B04B 11/06* (2013.01); *B04B 2001/2091* (2013.01)

(56) References Cited

U.S. PATENT DOCUMENTS

| | | | | |
|---|---|---|---|---|
| 1,057,613 A | | 4/1913 | Baldwin | |
| 1,061,656 A | | 5/1913 | Black | |
| 1,339,211 A | * | 5/1920 | McKerahan | 494/60 |
| 1,480,775 A | | 1/1924 | Marien | |
| 1,622,768 A | | 3/1927 | Cook | |
| 1,642,454 A | | 9/1927 | Malmstrom | |
| 1,930,476 A | * | 10/1933 | Hawley | 55/396 |
| 1,951,647 A | * | 3/1934 | Cooke | 196/46 |
| 1,987,884 A | * | 1/1935 | White | 55/346 |
| 1,998,784 A | * | 4/1935 | Mock | 261/83 |
| 2,006,244 A | | 6/1935 | Kopsa | |
| 2,300,766 A | | 11/1942 | Baumann | |
| 2,328,031 A | | 8/1943 | Risley | |
| 2,345,437 A | | 3/1944 | Tinker | |
| 2,347,939 A | | 5/1944 | Down | |
| 2,363,882 A | * | 11/1944 | Lundstrom | 55/392 |
| 2,383,244 A | | 8/1945 | Farmer | |
| 2,720,313 A | | 12/1951 | Pattison | |
| 2,602,462 A | | 7/1952 | Barrett | |
| 2,743,865 A | | 5/1956 | Graae | |
| 2,811,303 A | | 10/1957 | Ault | |
| 2,836,117 A | | 5/1958 | Lankford | |
| 2,868,565 A | | 1/1959 | Suderow | |
| 2,897,917 A | | 8/1959 | Hunter | |
| 2,932,360 A | | 4/1960 | Hungate | |
| 2,954,841 A | | 10/1960 | Reistle | |
| 2,955,673 A | | 10/1960 | Kennedy | |
| 3,044,657 A | | 7/1962 | Horton | |
| 3,395,511 A | | 9/1964 | Ernst | |
| 3,175,572 A | | 3/1965 | Kauer, Jr. | |
| 3,191,364 A | | 6/1965 | Sylvan | |
| 3,198,214 A | | 8/1965 | Lorenz | |
| 3,204,696 A | | 9/1965 | De Priester | |
| 3,213,794 A | | 10/1965 | Adams | |
| 3,220,245 A | | 11/1965 | Van Winkle | |
| 3,273,325 A | | 9/1966 | Gerhold | |
| 3,301,708 A | * | 1/1967 | Von Rotel | 127/19 |
| 3,341,111 A | | 9/1967 | Sanders | |
| 3,352,577 A | | 11/1967 | Medney | |
| 3,402,434 A | | 1/1969 | Swearingen | |
| 3,454,163 A | | 8/1969 | Read | |
| 3,487,432 A | | 12/1969 | Jenson | |
| 3,490,209 A | | 1/1970 | Fernandes | |
| 3,500,614 A | | 3/1970 | Soo | |
| 3,548,568 A | | 12/1970 | Carlson, Jr. | |
| 3,578,342 A | | 5/1971 | Welch | |
| 3,628,812 A | | 12/1971 | Larraide | |
| 3,672,733 A | | 1/1972 | Arsenius | |
| 3,646,727 A | | 3/1972 | Wachsmuth | |
| 3,694,103 A | | 9/1972 | Cohen | |
| 3,810,347 A | | 5/1974 | Kartinen | |
| 3,814,486 A | | 6/1974 | Schurger | |
| 3,829,179 A | | 8/1974 | Kurita | |
| 3,915,673 A | | 10/1975 | Tamai | |
| 3,973,930 A | | 8/1976 | Burgess | |
| 3,975,123 A | | 8/1976 | Schibbye | |
| 4,033,647 A | | 7/1977 | Beavers | |
| 4,043,353 A | | 8/1977 | Shirey | |
| 4,059,364 A | | 11/1977 | Anderson | |
| 4,066,552 A | * | 1/1978 | Caine | 210/304 |
| 4,078,809 A | | 3/1978 | Garrick | |
| 4,087,261 A | | 5/1978 | Hays | |
| 4,103,899 A | | 8/1978 | Turner | |
| 4,112,687 A | | 9/1978 | Dixon | |
| 4,117,359 A | | 9/1978 | Wehde | |
| 4,135,542 A | | 1/1979 | Chisholm | |
| 4,141,283 A | | 2/1979 | Swanson | |
| 4,146,261 A | | 3/1979 | Edmaier | |
| 4,165,622 A | | 8/1979 | Brown, Jr. | |
| 4,174,925 A | | 11/1979 | Pfenning et al. | |
| 4,182,480 A | | 1/1980 | Theyse | |
| 4,197,990 A | | 4/1980 | Carberg | |
| 4,205,927 A | | 6/1980 | Simmons | |
| 4,227,373 A | | 10/1980 | Amend | |
| 4,258,551 A | | 3/1981 | Ritzi | |
| 4,259,045 A | | 3/1981 | Teruyama | |
| 4,278,200 A | | 7/1981 | Gunnewig | |
| 4,298,311 A | | 11/1981 | Ritzi | |
| 4,303,372 A | | 12/1981 | Caffrey | |
| 4,333,748 A | | 6/1982 | Erickson | |
| 4,334,592 A | | 6/1982 | Fair | |
| 4,336,693 A | | 6/1982 | Hays | |
| 4,339,923 A | | 7/1982 | Hays | |
| 4,347,900 A | | 9/1982 | Barrington | |
| 4,363,608 A | | 12/1982 | Mulders | |
| 4,374,583 A | | 2/1983 | Barrington | |
| 4,375,975 A | | 3/1983 | McNicholas | |
| 4,382,804 A | | 5/1983 | Mellor | |
| 4,384,724 A | | 5/1983 | Derman | |
| 4,391,102 A | | 7/1983 | Studhalter | |
| 4,396,361 A | | 8/1983 | Fraser | |
| 4,432,470 A | | 2/1984 | Sopha | |
| 4,438,638 A | | 3/1984 | Hays | |
| 4,441,322 A | | 4/1984 | Ritzi | |
| 4,442,925 A | | 4/1984 | Fukushima | |
| 4,453,893 A | | 6/1984 | Hutmaker | |
| 4,453,894 A | | 6/1984 | Ferone | |
| 4,463,567 A | | 8/1984 | Amend | |
| 4,468,234 A | | 8/1984 | McNicholas | |
| 4,471,795 A | | 9/1984 | Linhardt | |
| 4,477,223 A | | 10/1984 | Giroux | |
| 4,502,839 A | | 3/1985 | Maddox | |
| 4,511,309 A | | 4/1985 | Maddox | |
| 4,531,888 A | | 7/1985 | Buchelt | |
| 4,536,134 A | | 8/1985 | Huiber | |
| 4,541,531 A | | 9/1985 | Brule | |
| 4,541,607 A | | 9/1985 | Hotger | |
| 4,573,527 A | | 3/1986 | McDonough | |
| 4,574,815 A | | 3/1986 | West | |
| 4,648,806 A | | 3/1987 | Alexander | |
| 4,650,578 A | | 3/1987 | Cerdan | |
| 4,687,017 A | | 8/1987 | Danko | |
| 4,721,561 A | | 1/1988 | Oetiker | |
| 4,737,081 A | | 4/1988 | Nakajima | |
| 4,752,185 A | | 6/1988 | Butler | |
| 4,807,664 A | | 2/1989 | Wilson | |
| 4,813,495 A | | 3/1989 | Leach | |
| 4,821,737 A | | 4/1989 | Nelson | |
| 4,826,403 A | | 5/1989 | Catlow | |
| 4,830,331 A | | 5/1989 | Vindum | |
| 4,832,709 A | | 5/1989 | Nagyszalanczy | |
| 4,904,284 A | | 2/1990 | Hanabusa | |
| 4,917,571 A | * | 4/1990 | Hyll et al. | 415/197 |
| 4,984,830 A | | 1/1991 | Saunders | |
| 5,007,328 A | | 4/1991 | Otterman | |
| 5,024,585 A | | 6/1991 | Kralovec | |
| 5,043,617 A | | 8/1991 | Rostron | |
| 5,044,701 A | | 9/1991 | Wantanabe | |
| 5,045,046 A | | 9/1991 | Bond | |
| 5,054,995 A | | 10/1991 | Kaseley | |
| 5,064,452 A | | 11/1991 | Yano | |
| 5,080,137 A | | 1/1992 | Adams | |
| 5,163,895 A | | 11/1992 | Titus | |
| 5,190,440 A | | 3/1993 | Maier | |
| 5,202,024 A | | 4/1993 | Andersson | |
| 5,202,026 A | | 4/1993 | Lema | |

(56) References Cited

U.S. PATENT DOCUMENTS

| | | |
|---|---|---|
| 5,203,891 A | 4/1993 | Lema |
| 5,207,810 A | 5/1993 | Sheth |
| 5,211,427 A | 5/1993 | Washizu |
| 5,244,479 A | 9/1993 | Dean, II |
| 5,246,346 A | 9/1993 | Schiesser |
| 5,280,766 A | 1/1994 | Mohn |
| 5,285,123 A | 2/1994 | Kataoka |
| 5,306,051 A | 4/1994 | Loker |
| 5,337,779 A | 8/1994 | Fukuhara |
| 5,378,121 A | 1/1995 | Hackett |
| 5,382,141 A | 1/1995 | Stinessen |
| 5,385,446 A | 1/1995 | Hays |
| 5,412,977 A | 5/1995 | Schmohl |
| 5,421,708 A | 6/1995 | Utter |
| 5,443,581 A | 8/1995 | Malone |
| 5,464,536 A | 11/1995 | Rogers |
| 5,484,521 A | 1/1996 | Kramer |
| 5,496,394 A | 3/1996 | Nied |
| 5,500,039 A | 3/1996 | Mori |
| 5,525,034 A | 6/1996 | Hays |
| 5,525,146 A | 6/1996 | Straub |
| 5,531,811 A | 7/1996 | Kloberdanz |
| 5,538,259 A | 7/1996 | Uhmer |
| 5,542,831 A | 8/1996 | Scarfone |
| 5,575,309 A | 11/1996 | Connell |
| 5,575,615 A | 11/1996 | Mohn |
| 3,431,747 A | 12/1996 | Hasheimi |
| 5,585,000 A | 12/1996 | Sassi |
| 5,605,172 A | 2/1997 | Schubert |
| 5,622,621 A | 4/1997 | Kramer |
| 5,628,623 A | 5/1997 | Skaggs |
| 5,634,492 A | 6/1997 | Steinruck |
| 5,640,472 A | 6/1997 | Meinzer |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,749,391 A | 5/1998 | Loutzenhiser |
| 5,750,040 A | 5/1998 | Hays |
| 5,775,882 A | 7/1998 | Kiyokawa |
| 5,779,619 A | 7/1998 | Borgstrom |
| 5,795,135 A | 8/1998 | Nyilas |
| 5,800,092 A | 9/1998 | Nill |
| 5,848,616 A | 12/1998 | Vogel |
| 5,850,857 A | 12/1998 | Simpson |
| 5,853,585 A | 12/1998 | Nesseth |
| 5,861,052 A | 1/1999 | Meinander |
| 5,863,023 A | 1/1999 | Evans |
| 5,899,435 A | 5/1999 | Mitsch |
| 5,935,053 A | 8/1999 | Strid |
| 5,938,803 A | 8/1999 | Dries |
| 5,938,819 A | 8/1999 | Seery |
| 5,946,915 A | 9/1999 | Hays |
| 5,951,066 A | 9/1999 | Lane |
| 5,965,022 A | 10/1999 | Gould |
| 5,967,746 A | 10/1999 | Hagi |
| 5,971,702 A | 10/1999 | Afton |
| 5,971,907 A | 10/1999 | Johannemann |
| 5,980,218 A | 11/1999 | Takahashi |
| 5,988,524 A | 11/1999 | Odajima |
| 6,027,311 A | 2/2000 | Hill |
| 6,035,934 A | 3/2000 | Stevenson |
| 6,059,539 A | 5/2000 | Nyilas |
| 6,068,447 A | 5/2000 | Foege |
| 6,090,174 A | 7/2000 | Douma |
| 6,090,299 A | 7/2000 | Hays |
| 6,113,675 A | 9/2000 | Branstetter |
| 6,122,915 A | 9/2000 | Hays |
| 6,123,363 A | 9/2000 | Burgard |
| 6,145,844 A | 11/2000 | Waggott |
| 6,149,825 A | 11/2000 | Gargas |
| 6,151,881 A | 11/2000 | Ai |
| 6,187,208 B1 | 2/2001 | White |
| 6,196,962 B1 | 3/2001 | Purvey |
| 6,206,202 B1 | 3/2001 | Galk |
| 6,214,075 B1 | 4/2001 | Filges |
| 6,217,637 B1 | 4/2001 | Toney |
| 6,227,379 B1 | 5/2001 | Nesseth |
| 6,277,278 B1 | 8/2001 | Conrad |
| 6,312,021 B1 | 11/2001 | Thomas |
| 6,314,738 B1 | 11/2001 | Hays |
| 6,372,006 B1 | 4/2002 | Pregenzer |
| 6,375,437 B1 | 4/2002 | Nolan |
| 6,383,262 B1 | 5/2002 | Marthinsen |
| 6,394,764 B1 | 5/2002 | Samurin |
| 6,398,973 B1 | 6/2002 | Saunders |
| 6,402,465 B1 | 6/2002 | Maier |
| 6,426,010 B1 | 7/2002 | Lecoffre |
| 6,464,469 B1 | 10/2002 | Grob |
| 6,467,988 B1 | 10/2002 | Czachor |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Sauders |
| 6,537,035 B2 | 3/2003 | Shumway |
| 6,540,917 B1 | 4/2003 | Rachels |
| 6,547,037 B2 | 4/2003 | Kuzdzal |
| 6,592,654 B2 | 7/2003 | Brown |
| 6,596,046 B2 | 7/2003 | Conrad |
| 6,599,086 B2 | 7/2003 | Soja |
| 6,607,348 B2 | 8/2003 | Jean |
| 6,616,719 B1 | 9/2003 | Sun |
| 6,617,731 B1 | 9/2003 | Goodnick |
| 6,629,825 B2 | 10/2003 | Stickland |
| 6,631,617 B1 | 10/2003 | Dreiman |
| 6,658,986 B2 | 12/2003 | Pitla |
| 6,659,143 B1 | 12/2003 | Taylor |
| 6,669,845 B2 | 12/2003 | Klass |
| 6,688,802 B2 | 2/2004 | Ross |
| 6,707,200 B2 | 3/2004 | Carroll |
| 6,718,955 B1 | 4/2004 | Knight |
| 6,719,830 B2 | 4/2004 | Illingworth |
| 6,764,284 B2 | 7/2004 | Oehman |
| 6,776,812 B2 | 8/2004 | Komura |
| 6,802,693 B2 | 10/2004 | Reinfeld |
| 6,802,881 B2 | 10/2004 | Illingworth |
| 6,811,713 B2 | 11/2004 | Arnaud |
| 6,817,846 B2 | 11/2004 | Bennitt |
| 6,827,974 B2 | 12/2004 | Nelson |
| 6,837,913 B2 | 1/2005 | Schilling |
| 6,843,836 B2 | 1/2005 | Kitchener |
| 6,878,187 B1 | 4/2005 | Hays |
| 6,893,208 B2 | 5/2005 | Frosini |
| 6,907,933 B2 | 6/2005 | Choi |
| 6,979,358 B2 | 12/2005 | Ekker |
| 7,000,893 B2 | 2/2006 | Yakushi |
| 7,001,448 B1 | 2/2006 | West |
| 7,013,978 B2 | 3/2006 | Appleford |
| 7,022,150 B2 | 4/2006 | Borgstrom |
| 7,022,153 B2 | 4/2006 | McKenzie |
| 7,025,890 B2 | 4/2006 | Moya |
| 7,033,410 B2 | 4/2006 | Hilpert |
| 7,033,411 B2 | 4/2006 | Carlsson |
| 7,056,363 B2 | 6/2006 | Carlsson |
| 7,063,465 B1 | 6/2006 | Wilkes |
| 7,112,036 B2 | 9/2006 | Lubell |
| 7,131,292 B2 | 11/2006 | Ikegami |
| 7,144,226 B2 | 12/2006 | Pugnet |
| 7,159,723 B2 | 1/2007 | Hilpert |
| 7,160,518 B2 | 1/2007 | Chen |
| 7,169,305 B2 | 1/2007 | Gomez |
| 7,185,447 B2 | 3/2007 | Arbeiter |
| 7,204,241 B2 | 4/2007 | Thompson |
| 7,241,392 B2 | 7/2007 | Maier |
| 7,244,111 B2 | 7/2007 | Suter |

(56) References Cited

U.S. PATENT DOCUMENTS

| | | |
|---|---|---|
| 7,258,713 B2 | 8/2007 | Eubank |
| 7,270,145 B2 | 9/2007 | Koezler |
| 7,288,139 B1 | 10/2007 | Showalter |
| 7,288,202 B2 | 10/2007 | Maier |
| 7,314,560 B2 | 1/2008 | Yoshida |
| 7,323,023 B2 | 1/2008 | Michele et al. |
| 7,328,749 B2 | 2/2008 | Reitz |
| 7,335,313 B2 | 2/2008 | Moya |
| 7,377,110 B2 | 5/2008 | Sheridan |
| 7,381,235 B2 | 6/2008 | Koene |
| 7,396,373 B2 | 7/2008 | Lagerstedt |
| 7,399,412 B2 | 7/2008 | Keuschnigg |
| 7,435,290 B2 | 10/2008 | Lane |
| 7,445,653 B2 | 11/2008 | Trautmann |
| 7,470,299 B2 | 12/2008 | Han |
| 7,473,083 B2 | 1/2009 | Oh |
| 7,479,171 B2 | 1/2009 | Cho |
| 7,494,523 B2 | 2/2009 | Oh |
| 7,501,002 B2 | 3/2009 | Han |
| 7,520,210 B2 | 4/2009 | Theodore, Jr. |
| 7,575,422 B2 | 8/2009 | Bode |
| 7,578,863 B2 | 8/2009 | Becker |
| 7,591,882 B2 | 9/2009 | Harazim |
| 7,594,941 B2 | 9/2009 | Zheng |
| 7,594,942 B2 | 9/2009 | Polderman |
| 7,610,955 B2 | 11/2009 | Irwin |
| 7,628,836 B2 | 12/2009 | Baronet |
| 7,637,699 B2 | 12/2009 | Albrecht |
| 7,674,377 B2 | 3/2010 | Carew |
| 7,677,308 B2 | 3/2010 | Kolle |
| 7,708,537 B2 | 5/2010 | Bhatia |
| 7,708,808 B1 | 5/2010 | Heumann |
| 7,744,663 B2 | 6/2010 | Wallace |
| 7,748,079 B2 | 7/2010 | McDowell |
| 7,766,989 B2 | 8/2010 | Lane |
| 7,811,344 B1 | 10/2010 | Duke |
| 7,811,347 B2 | 10/2010 | Carlsson |
| 7,815,415 B2 | 10/2010 | Kanezawa |
| 7,824,458 B2 | 11/2010 | Borgstrom |
| 7,824,459 B2 | 11/2010 | Borgstrom |
| 7,846,228 B1 | 12/2010 | Saaaki |
| 7,938,874 B2 | 5/2011 | Auber |
| 2001/0007283 A1 | 7/2001 | Johal |
| 2002/0009361 A1 | 1/2002 | Reichert |
| 2003/0029318 A1 | 2/2003 | Firey |
| 2003/0035718 A1 | 2/2003 | Langston |
| 2003/0136094 A1 | 7/2003 | Illingworth |
| 2003/0192718 A1 | 10/2003 | Buckman |
| 2004/0007261 A1 | 1/2004 | Cornwell |
| 2004/0170505 A1 | 9/2004 | Lenderink |
| 2005/0173337 A1 | 8/2005 | Costinel |
| 2005/0241178 A1 | 11/2005 | Arbeiter |
| 2006/0065609 A1 | 3/2006 | Arthur |
| 2006/0090430 A1 | 5/2006 | Trautman |
| 2006/0096933 A1 | 5/2006 | Maier |
| 2006/0157251 A1 | 7/2006 | Stinessen |
| 2006/0157406 A1 | 7/2006 | Maier |
| 2006/0193728 A1 | 8/2006 | Lindsey |
| 2006/0222515 A1 | 10/2006 | Delmotte |
| 2006/0230933 A1 | 10/2006 | Harazim |
| 2006/0239831 A1 | 10/2006 | Garris, Jr. |
| 2006/0254659 A1 | 11/2006 | Ballot |
| 2006/0275160 A1 | 12/2006 | Leu |
| 2007/0029091 A1 | 2/2007 | Stinessen |
| 2007/0036646 A1 | 2/2007 | Nguyen |
| 2007/0051245 A1 | 3/2007 | Yun |
| 2007/0062374 A1 | 3/2007 | Kolle |
| 2007/0065317 A1 | 3/2007 | Stock |
| 2007/0084340 A1 | 4/2007 | Dou |
| 2007/0140815 A1 | 6/2007 | Shinozaki |
| 2007/0140870 A1 | 6/2007 | Fukanuma |
| 2007/0151922 A1 | 7/2007 | Mian |
| 2007/0163215 A1 | 7/2007 | Lagerstadt |
| 2007/0172363 A1 | 7/2007 | Laboube |
| 2007/0196215 A1 | 8/2007 | Frosini |
| 2007/0227969 A1 | 10/2007 | Dehaene |
| 2007/0256398 A1 | 11/2007 | Barone |
| 2007/0294986 A1 | 12/2007 | Beetz |
| 2008/0031732 A1 | 2/2008 | Peer |
| 2008/0039732 A9 | 2/2008 | Bowman |
| 2008/0179261 A1 | 7/2008 | Patrovsky |
| 2008/0246281 A1 | 10/2008 | Agrawal |
| 2008/0315812 A1 | 12/2008 | Balboul |
| 2009/0013658 A1 | 1/2009 | Borgstrom |
| 2009/0015012 A1 | 1/2009 | Metzler |
| 2009/0025562 A1 | 1/2009 | Hallgren |
| 2009/0025563 A1 | 1/2009 | Borgstrom |
| 2009/0151928 A1 | 6/2009 | Lawson |
| 2009/0169407 A1 | 7/2009 | Yun |
| 2009/0173095 A1 | 7/2009 | Bhatia |
| 2009/0266231 A1 | 10/2009 | Franzen |
| 2009/0304496 A1 | 12/2009 | Maier |
| 2009/0321343 A1 | 12/2009 | Maier |
| 2009/0324391 A1 | 12/2009 | Maier |
| 2010/0007133 A1 | 1/2010 | Maier |
| 2010/0021292 A1 | 1/2010 | Maier |
| 2010/0038309 A1 | 2/2010 | Maier |
| 2010/0043288 A1 | 2/2010 | Wallace |
| 2010/0043364 A1 | 2/2010 | Curien |
| 2010/0044966 A1 | 2/2010 | Majot |
| 2010/0072121 A1 | 3/2010 | Maier |
| 2010/0074768 A1 | 3/2010 | Maier |
| 2010/0083690 A1 | 4/2010 | Sato |
| 2010/0090087 A1 | 4/2010 | Maier |
| 2010/0139776 A1 | 6/2010 | Auber |
| 2010/0143172 A1 | 6/2010 | Sato |
| 2010/0163232 A1 | 7/2010 | Kolle |
| 2010/0183438 A1 | 7/2010 | Maier |
| 2010/0239419 A1 | 9/2010 | Maier |
| 2010/0239437 A1 | 9/2010 | Maier |
| 2010/0247299 A1 | 9/2010 | Maier |
| 2010/0257827 A1 | 10/2010 | Lane |
| 2011/0017307 A1 | 1/2011 | Kidd |
| 2011/0061536 A1 | 3/2011 | Maier |

FOREIGN PATENT DOCUMENTS

| | | |
|---|---|---|
| CA | 2647511 | 10/2007 |
| DE | 1024439 B | 2/1958 |
| EP | 0150599 | 8/1985 |
| EP | 301285 | 10/1991 |
| EP | 561065 | 11/1991 |
| EP | 552837 | 1/1993 |
| EP | 1582703 | 10/2005 |
| EP | 2013479 | 1/2009 |
| EP | 7838631.5 | 12/2009 |
| EP | 2233745 | 9/2010 |
| EP | 2322282 | 5/2011 |
| EP | 1796808 | 7/2011 |
| GB | 417373 | 10/1934 |
| GB | 1192354 | 5/1970 |
| GB | 1512381 | 6/1978 |
| GB | 2323639 | 9/1998 |
| GB | 2337561 | 11/1999 |
| GB | 2477699 | 8/2011 |
| JP | 54099206 | 1/1978 |
| JP | 80 68501 | 3/1996 |
| JP | 8-284961 A | 11/1996 |
| JP | 2002 242699 | 8/2002 |
| JP | 3711028 | 10/2005 |
| JP | 2005291202 | 10/2005 |
| KR | 2009085521 | 2/2008 |
| MX | 2008012579 | 12/2008 |
| WO | WO9524563 | 9/1995 |
| WO | WO9619276 | 6/1996 |
| WO | WO0074811 | 12/2000 |
| WO | WO0117096 | 3/2001 |
| WO | WO2005003512 | 1/2005 |
| WO | WO2006029413 | 3/2006 |
| WO | WO2006053088 | 5/2006 |
| WO | WO2007043889 | 4/2007 |
| WO | WO2007103248 | 9/2007 |
| WO | WO2007120506 | 10/2007 |
| WO | WO2008036221 | 3/2008 |

(56) References Cited

FOREIGN PATENT DOCUMENTS

| | | |
|---|---|---|
| WO | WO2008039446 | 3/2008 |
| WO | WO2008039491 | 4/2008 |
| WO | WO2008039731 | 4/2008 |
| WO | WO2008039732 | 4/2008 |
| WO | WO2008039733 | 4/2008 |
| WO | WO2008039734 | 4/2008 |
| WO | WO2008036394 | 7/2008 |
| WO | WO2009111616 | 9/2009 |
| WO | WO2009158252 | 12/2009 |
| WO | WO2009158253 | 12/2009 |
| WO | WO2010065303 | 6/2010 |
| WO | WO2010083416 | 7/2010 |
| WO | WO2010083427 | 7/2010 |
| WO | WO2010107579 | 9/2010 |
| WO | WO2010110992 | 9/2010 |
| WO | WO2011034764 | 3/2011 |
| WO | WO2011100158 | 8/2011 |
| WO | WO2012009158 | 1/2012 |
| WO | WO2012009159 | 1/2012 |
| WO | WO2012012143 | 1/2012 |
| WO | WO20120033632 | 3/2012 |

OTHER PUBLICATIONS

Tri-Phase Rotary Separator Turbine, Multiphase Power & Processing Technologies LLC Technical Literature at http://www/mpptech.com/techpp/pdfs/Tri-Phase.pdf).
IRIS™ In-Line Rotary Separator/Scrubber, Multiphase Power & Processing Technologies LLC Technical Literature (available at http://www.mpptech.com/products/IRIS_Rev5.2PDF).
Testing of an In-Line Rotary Separator (IRIS™) at the Chevron.
F. Ramirez Gas Production Facility by Hank Rawlins and Frank Ting, Presented at 52nd Annual Laurence Reid Gas Conditioning Conference, The University of Oklahoma, Feb. 24-27, 2002.
Utilization of Inline Rotary Separator as a Wet Gas Meter by V.C. Ting Presented at the 19th North Sea Flow Measurement Workshop 2001.
Analysis of Results of a Rotary Separator Rubine on the Shell Ram-Powell TLP by Greg Ross, Keith Oxley and Hank Rowlins.
Field Test Results of a Rotary Separator Turbine on the Ram/Powell TLP by C.H. Rawlins and G.D. Ross, presented at the 2001 Offshore Technology Conference in Houston, Texas Apr. 30-May 3, 2001.
Two-Phase Flow Turbines in Oil and Gas Production and Processing by Geirmund Vislie and Simon RH Davies.
Further Developments of the Biphase Rotary Separator Turbine by Geirmund Vislie, Simon Davies and Lance Hays.
"Technical Manual—High Pessure Air Compressor Model 13NL45", NAVSEA S6220-AT-MMA-010/93236, Oct. 28, 1991, pp. 3-23 to 3-32, Electric Boat Corporation, Groton, CT 06340.
EP05796401—Supplementary European Search Report mailed Aug. 26, 2008.
EP10196474—European Search Report mailed Mar. 21, 2011.
PCT/GB95/00193 Notification of International Search Report mailed Jun. 2, 1995.
PCT/FI00/00496—International Search Report mailed Oct. 16, 2000.
PCT/US2005/032556—Notification of International Preliminary Report on Patentability mailed Mar. 13, 2007.
PCT/US2005/032556—Notification of International Search Report and Written Opinion mailed Oct. 18, 2006.
PCT/US2005/040664—Notification of International Search Report and Written Opinion mailed Oct. 17, 2006.
PCT/NO2006/000341—International Search Report mailed Jan. 11, 2007.
PCT/US2007/008149—International Preliminary Report on Patentability dated Sep. 30, 2008.
PCT/US2007/008149—Written Opinion dated Jul. 17, 2008.
PCT/US2007/020101—International Preliminary Report on Patentability dated Apr. 2, 2009.
PCT/US2007/020101—International Search Report dated Apr. 29, 2008.
PCT/US2007/020471—International Preliminary Report on Patentability dated Apr. 2, 2009.
PCT/US2007/020471—International Search Report and Written Opinion dated Apr. 1, 2008.
PCT/US2007/020659—International Preliminary Report on Patentability dated Mar. 31, 2009.
PCT/US2007/020659—International Search Report and Written Opinion dated Sep. 17, 2008.
PCT/US2007/020768—International Preliminary Report on Patentability dated Apr. 9, 2009.
PCT/US2007/020768—International Search Report and Written Opinion dated Mar. 3, 2008.
PCT/US2007/079348—International Preliminary Report on Patentability dated Apr. 9, 2009.
PCT/US2007/079348—International Search Report dated Apr. 11, 2008.
PCT/US2007/079348—Written Opinion mailed Apr. 11, 2008.
PCT/US2007/079349—International Preliminary Report on Patentability dated Mar. 31, 2009.
PCT/US2007/079349—International Search Report and Written Opinion dated Apr. 2, 2008.
PCT/US2007/079350—International Preliminary Report on Patentability mailed Apr. 9, 2009.
PCT/US2007/079350—International Search Report mailed Apr. 2, 2008.
PCT/US2007/079350—Written Opinion mailed Apr. 2, 2008.
PCT/US2007/079352—International Preliminary Report on Patentability dated Apr. 9, 2009.
PCT/US2007/079352—International Search Report and Written Opinion dated Aug. 27, 2008.
PCT/US2009/036142—International Preliminary Report on Patentability dated Sep. 16, 2010.
PCT/US2009/036142—International Search Report mailed May 11, 2009.
PCT/US2009/036142—Written Opinion dated May 11, 2009.
PCT/US2009/047662—International Preliminary Report on Patentability dated Jan. 13, 2011.
PCT/US2009/047662—Written Opinion dated Aug. 20, 2009.
PCT/US2009/064916—Notification of International Preliminary Report on Patentability mailed Jun. 16, 2011.
PCT/US2009/064916—Notification of International Search Report and Written Opinion mailed Jan. 25, 2010.
PCT/US2010/021199—International Preliminary Report on Patentability dated Mar. 29, 2011.
PCT/US2010/021199—International Search Report and Written Opinion dated Mar. 22, 2010.
PCT/US2010/021218—International Report on Patentability dated Feb. 2, 2011.
PCT/US2010/021218—International Search Report and Written Opinion dated Mar. 23, 2010.
PCT/US2010/025650—International Report on Patentability dated Mar. 14, 2011.
PCT/US2010/025650—International Search Report and Written Opinion dated Apr. 22, 2010.
PCT/US2010/025952—International Report on Patentability dated Mar. 14, 2011.
PCT/US2010/025952—International Search Report and Written Opinion dated Apr. 12, 2010.
PCT/US2011/023593—Notification of International Search Report and Written Opinion dated Oct. 18, 2011.
PCT/US2011/037112—Notification of International Search Report and Written Opinion mailed Jan. 13, 2012.
PCT/US2011/042205—Notification of International Search Report and Written Opinion mailed Feb. 21, 2012.
PCT/US2011/042209—International Search Report mailed Feb. 24, 2012.
PCT/US2011/042227—Notification of International Search Report dated Feb. 21, 2012.
PCT/US2011/048652—Notification of International Search Report and Written Opinion mailed Jan. 9, 2012.

\* cited by examiner

SEPARATOR FLUID COLLECTOR AND METHOD

CROSS-REFERENCE TO RELATED APPLICATIONS

The present application is a national stage application of PCT Pat. App. No. PCT/US2011/023593, filed Feb. 3, 2011, which claims priority to U.S. Patent Application Ser. No. 61/303,273, which was filed Feb. 10, 2010. The priority applications are hereby incorporated by reference in their entirety into the present application.

BACKGROUND

Centrifugal separators are a class of density-based separators, which swirl a fluid flow to separate liquids from gases therein, dense liquids from less-dense liquids, and/or solids from fluids. The separated components may be received by a collection "belt," which may be disposed around the separator, and may drain the separated components from the separator. Collection belts are usually axisymmetric and may allow the separated components to travel many times circumferentially around the separator before actually exiting the collection belt through a drain. This may lead to undesired splashing, re-introduction of the separated components back to the fluid flow being separated, and/or limitations on flow capacity. Solutions to these problems include making the collector region sufficiently large so as to accommodate maximum anticipated amounts of the separated components, and/or positioning the collection belt far enough away from the inlet thereof so as to limit re-introduction due to splashing; however, these solutions can limit throughput and may fail during off-design conditions. Another solution includes using a non-axisymmetric, volute-shaped collector; however, such geometries require expensive and time-consuming fabrication. Thus, there is a need for an improved collection belt that does not suffer from these and other drawbacks.

SUMMARY

Embodiments of the present disclosure may provide an exemplary collection apparatus for a separator. The exemplary collection apparatus may include a housing at least partially encircling a flow separation passage and defining a chamber and a cutout, the chamber being in fluid communication with the flow separation passage to receive a separated flow therefrom, and the cutout extending outward from the chamber to at least partially deflect the separated flow.

Embodiments of the disclosure may further provide an exemplary separation method, including separating a first component of a fluid from a second component of the fluid in a density-based separator, directing the first component of the fluid to a chamber of the separator such that the first component flows vortically along an interior wall that at least partially defines the chamber, at least partially deflecting the first component of the fluid flowing along the inner wall with a cutout extending outward from the interior wall such that the deflected first component is received in the cutout, and draining the deflected first component from the cutout.

Embodiments of the disclosure may also provide a fluid separator, including a drum having a fluid inlet end, a fluid outlet end, and at least partially defining a flow passage therebetween through which a fluid flows, a housing at least partially surrounding the drum and having an interior wall defining a substantially toroidal chamber and a radial slot communicating with the chamber and the flow passage of the drum, the chamber adapted to receive at least some of the fluid from the drum via the slot, the interior wall further defining first and second cutouts extending outward from a center of the chamber, and a drain coupled to the housing, fluidly communicating with the chamber, and tangentially disposed in relation to the interior wall.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
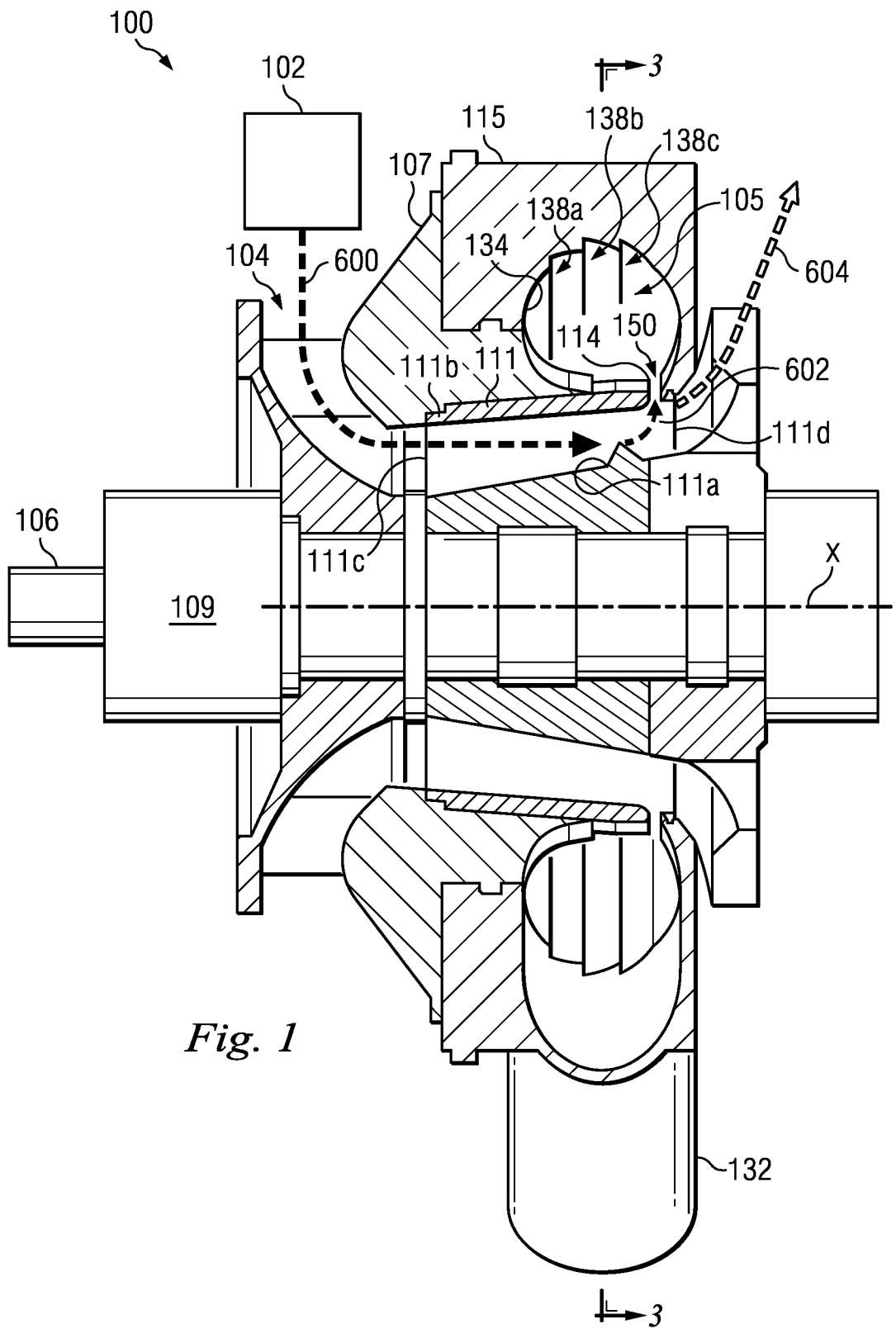
FIG. 1 illustrates a side sectional view of a separator, in accordance with one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from an exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims, the term "or" is intended to encompass both exclusive and inclusive cases, i.e., "A or B" is intended to be synonymous with "at least one of A and B," unless otherwise expressly specified herein.

FIG. 1 illustrates a side sectional view of a separator 100, which may be a centrifugal rotary separator, according to one or more embodiments of the present disclosure. The separator 100 generally includes a centrifugal separation zone 111, a casing 107 including a liquid collection housing 115 disposed around (i.e., at least partially encircling) the centrifugal separation zone 111, and a drain 132. In one or more embodiments, the centrifugal separation zone 111 may be a rotatable drum 111. Although the term "liquid" may be used herein to describe various components of the separator 100, this terminology not to be considered limiting, as the separator 100 may be any type of separator, and may be, for example, configured to separate gases from liquids, solids from liquids or gases, dense liquids from less-dense liquids, dense gases from less-dense gases, or any combination thereof.

A separation passage 104 may be defined in the casing 107 and the drum 111, such that a source of fluid 102 is fluidically coupled thereto. As such, a fluid flow may enter the separator 100, specifically the drum 111, via the separation passage 104 from the source 102, as schematically depicted by arrow 600. In one or more embodiments, the source of fluid 102 may be a well, a pipeline, or any other source. The fluid flow 600 may be separated into high and low density flows 602, 604, respectively, as will be described in greater detail below. Additionally, although the fluid flows 600, 602, 604 are shown in the top half of the separator 100, it will be readily apparent that the fluid proceeds radially around the separator 100, and thus will flow through the lower half as well.

In one or more embodiments, the separator 100 may include a shaft 106, which may be disposed partially or completely in the casing 107. The shaft 106 may also extend through and outside of the casing 107. The drum 111 may be coupled to the shaft 106 via a hub (not shown) or any suitable coupling device and/or using any coupling process. The drum 111 may also have an inlet 111c and an outlet end 111d, with the separation passage 104 partially defined in the drum 111 between the inlet 111c and the outlet end 111d.

Additionally, in one or more embodiments, a rotary mechanism 109, such as a turbine, engine, motor, generator, and/or the like, may be coupled to the shaft 106, and may be adapted to rotate the shaft 106 about axis X to drive the separator 100. In one or more embodiments, however, the rotary mechanism 109 may be omitted, and forces arising from the interaction with the fluid flow 600 with various components of the separator 100 in the separation passage 104 may be used to rotate the drum 111. Furthermore, in one or more embodiments, the drum 111 may be omitted, with the separator fluid passage 104 formed between the housing 115 and a static inner wall, which although not depicted, may be similar to an inner surface 111a of the separation passage 104.

The liquid collection housing 115 may have a generally toroidal interior wall 134 defining a tubular liquid collection chamber 105. The liquid collection chamber 105, being at least partially defined by an interior wall 134, may also be toroidal as well as tubular. It will be appreciated that other geometries for the interior wall 134 and/or the liquid collection chamber 105 may be employed without departing from the scope of this disclosure. The separator 100 may define an entrance 150 to the liquid collection chamber 105. In one or more embodiments, the entrance 150 may be positioned proximal an edge 114 of the drum 111, with the edge 114 being disposed at the outlet end 111d of the drum. The separation passage 104 may fluidly communicate with the liquid collection chamber 105 via the entrance 150. The liquid collection chamber 105 may be fluidly coupled to the drain 132, such that liquids, solids, dense gasses, or the like received in the liquid collection chamber 105 may be removed therefrom. The liquid collection housing 115 may also define a plurality of cutouts, for example, a first cutout 138a, a second cutout 138b, and a third cutout 138c, defined in the liquid collection housing 115 and extending outward from the liquid collection chamber 105. It will be appreciated that any number of cutouts may be disposed in the liquid collection housing 115, with the description herein of the separator 100 including three cutouts 138a-c being just one example among many embodiments contemplated herein.

The cutouts 138a-c may be formed in any manner, such as by milling, casting, or the like. In one or more embodiments, the cutouts 138a-c may extend continuously around the liquid collection chamber 105 (i.e., around the axis X), or may be discontinuous and separated by uncut portions. In other embodiments, the cutouts 138a-c may be discontinuous and separated by additional cutouts 138a-c that may be, for example, circumferentially offset or staggered in relation to the cutouts 138a-c. In at least one exemplary embodiment, the first cutout 138a is adjacent to the second cutout 138b, which in turn is adjacent to the third cutout 138c, thereby forming corners where the first, second, and third cutouts 138a-c meet at the interior wall 134.

Figure 2:
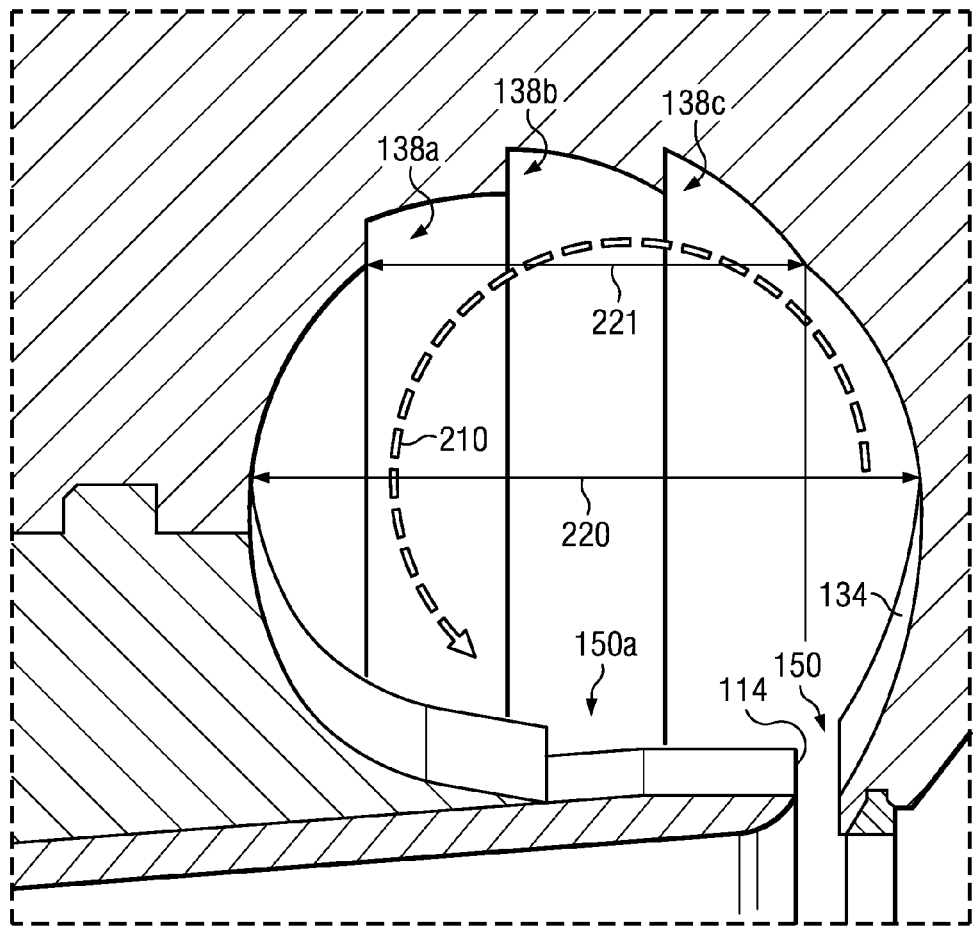
FIG. 2 illustrates an enlarged side sectional view of chamber of the separator, in accordance with one or more aspects of the disclosure.

FIG. 2 illustrates an enlarged side sectional view of the liquid collection housing 115. Although the three cutouts 138a-c are shown immediately adjacent to each other, in other embodiments, the cutouts 138a-c may be circumferentially spaced apart around the liquid collection chamber 105. Further, the cutouts 138a-c may span from about 20% to about 100% of a circumference of the liquid collection chamber 105 defined by a minor diameter 220. For example, the cutouts 138a-c may extend outward from the liquid collection chamber 105 between two points of the interior wall 134, thereby spanning a cord 221 of the interior wall 134. The cord 221 may be from about 50% to about 100% of the minor diameter 220 in length. In other embodiments, the cutouts 138a-c may span a different length or percentage of the minor diameter 220. In one or more embodiments, the cutouts 138a-c may be formed extending along any percentage of the interior wall 134.

As shown, the entrance 150 may be formed by aligning the edge 114 of the drum 111 with a slot 150a cut or otherwise formed in the liquid collection housing 115. The slot 150a may have any width, and may also be described as a truncated side of the toroidal interior wall 134. The edge 114 may extend past a part of the slot 150a, as shown, thereby obstructing a portion of the slot 150a. In other embodiments, the edge 114 may be flush with an edge of the slot 150a, such that the slot 150a is unobstructed by the drum 111. In one or more embodiments, the edge 114 of the drum 111 may be positioned at any number of locations so as to provide a desired entrance 150 size.

Figure 3:
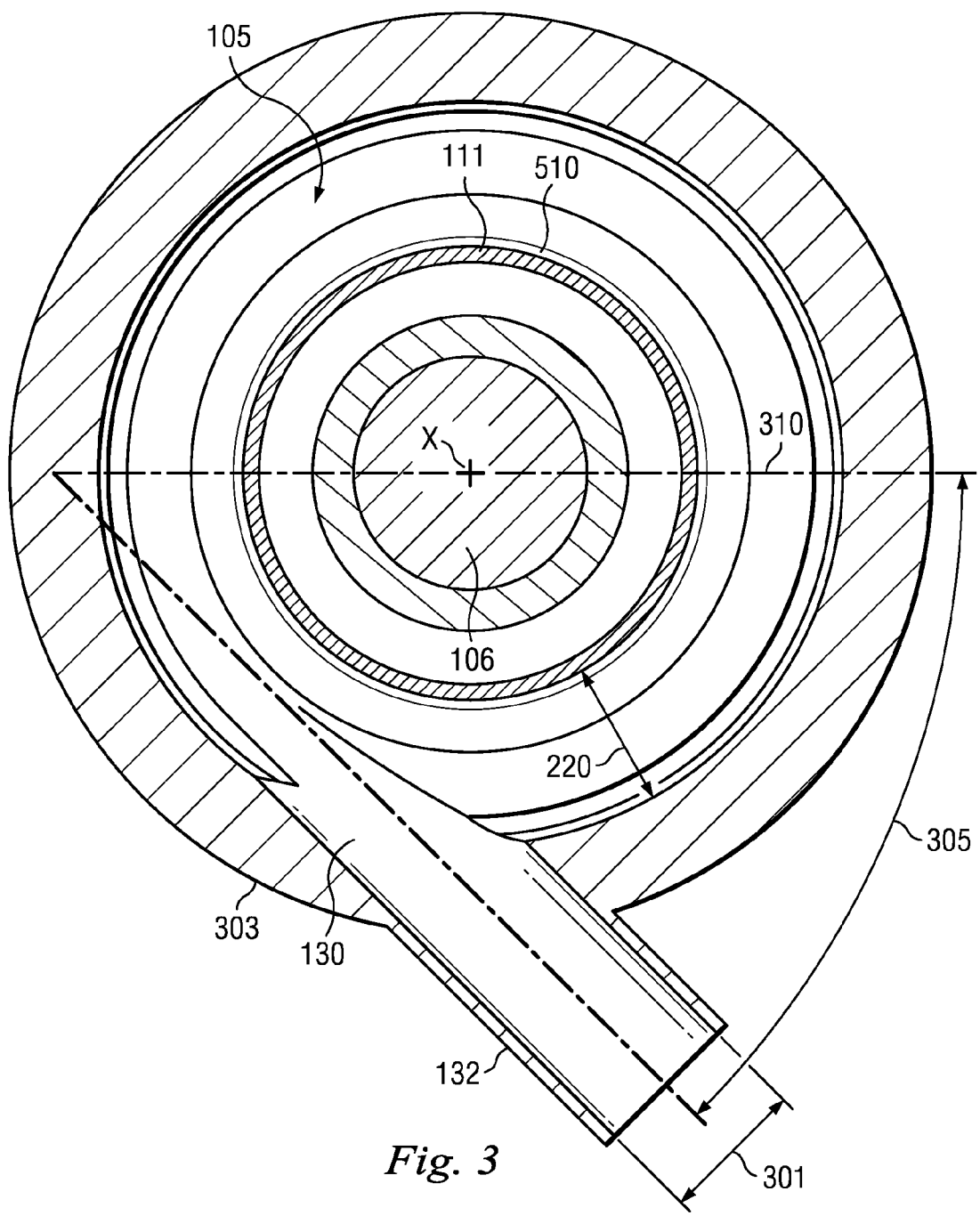
FIG. 3 illustrates an axial sectional view of the exemplary separator along line 3-3 of FIG. 1, in accordance with one or more aspects of the disclosure.

FIG. 3 illustrates an axial sectional view of the separator 100 along line 3-3 of FIG. 1. The drain 132 may have a diameter 301 and may be coupled to the liquid collection chamber 105 to receive and remove separated liquids, solids, and/or gases therefrom. The diameter 301 may be approximately equal to the minor diameter 220 of the of the liquid collection chamber 105, and may be tangentially disposed with respect to the liquid collection chamber 105. Further, the drain 132 may be disposed, or "clocked," at an angle 305 with respect to a horizontal centerline 310 of the separator 100. For example, the angle 305 may be defined by the angle at which the drain 132 is tangent to the liquid collection chamber 105. In one or more embodiments, the angle 305 may be from about 20 degrees, about 30 degrees, or about 40 degrees to about 50 degrees, about 60 degrees, or about 70 degrees. For example, the angle 305 may be about 45 degrees. In other embodiments, the drain 132 may be disposed at different angles 305 with respect to the liquid collection chamber 105. Further, an interior surface 510 may define a radial inside of the liquid collection chamber 105. The interior surface 510 may be substantially annular and disposed around the central axis X. In other embodiments, the drum 111 may provide the interior surface 510.

Figure 4:
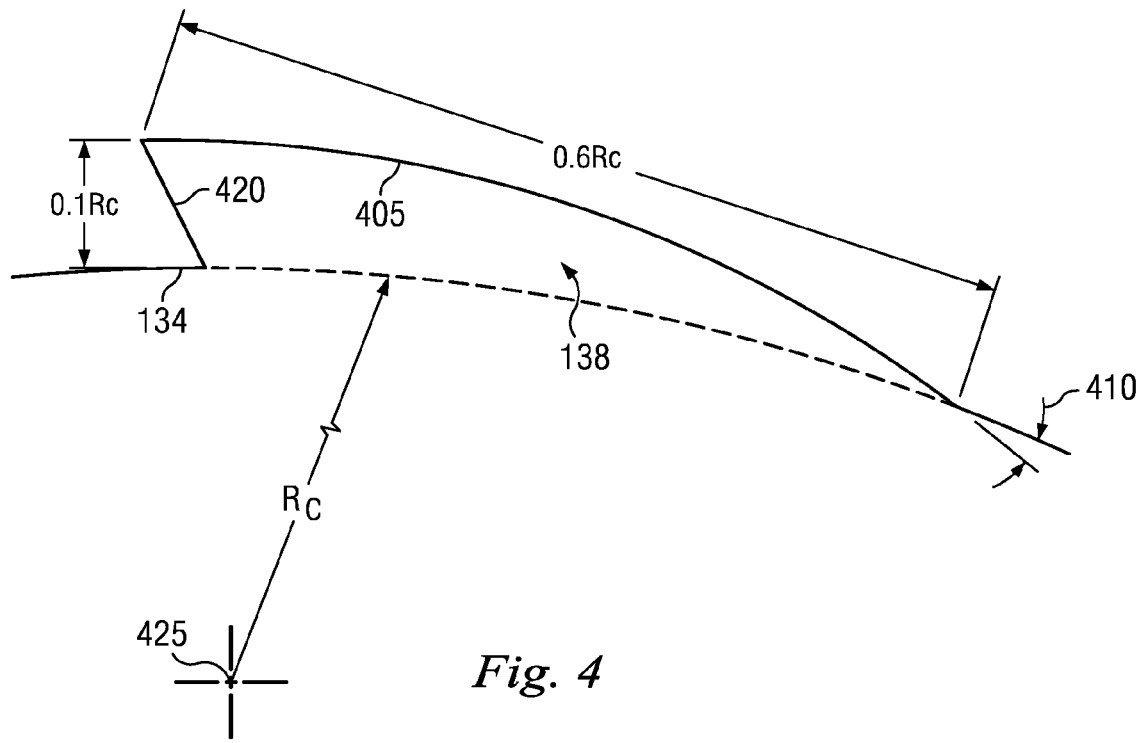
FIG. 4 illustrates a diagrammatic view of a chamber cutout, in accordance with one or more aspects of the disclosure.

FIG. 4 illustrates a sectional view of a cutout 138, which may be any of the cutouts 138a-c described above with reference to FIGS. 1 and 2, or may be a different cutout. The cutout 138 may have an arcuate outer wall 405 and an edge 420, both extending from the interior wall 134. In one or more embodiments, the edge 420 is flat, i.e., in cross-section it is a straight line, substantially free from curvature. It will be appreciated, however, that the cutout 138 extends around the axis X (FIG. 1), and, as such, despite being described as "flat" or "free from curvature" it will be appreciated that the edge 420 may extend circumferentially as well. The arcuate outer wall 405 may meet the interior wall 134 at an angle 410. In one or more embodiments, the angle 410 may range from about 5 degrees, about 7 degrees, or about 9 degrees to about 11 degrees, about 13 degrees, or about 15 degrees. For example, the angle 410 may be about 10 degrees. In other embodiments, the angle 410 may be significantly larger or smaller than 10 degrees, as desired.

A radius Rc of the liquid collection chamber 105 may extend from a center 425 thereof to the interior wall 134. The arcuate outer wall 405 may have a length that ranges from about 35%, about 45%, or about 55% to about 65%, about 75%, or about 85% of the radius Rc. For example, the length of the arcuate outer wall 405 may be about 60% of the radius Rc.

The edge 420 may extend from the interior wall 134 and connect to the arcuate outer wall 405. The edge 420 may meet the interior wall 134 to form an obtuse angle, as shown, although the angle may also be a right or acute angle. Having an obtuse angle, however, may provide the cutout 138 with additional cross-sectional area proceeding radially outward. In one or more embodiments, the edge 420 may connect to a terminus of the arcuate outer wall 405, as shown; however, in various other embodiments, the edge 420 may connect to the arcuate outer wall 405 at other locations, leaving, for example, an overhung portion of the arcuate outer wall 405 (structure not shown). In one or more embodiments, the edge 420 may meet the arcuate outer wall 405 at an acute angle, as shown, such that the edge 420 may act as a lip or scoop, but in other embodiments may meet at any angle. The length of the edge 420 may range from about 5%, about 7%, or about 9% to about 11%, about 13% or about 15% of the radius Rc. For example, the length of the edge 420 may be about 10% of the radius Rc.

Figure 5:
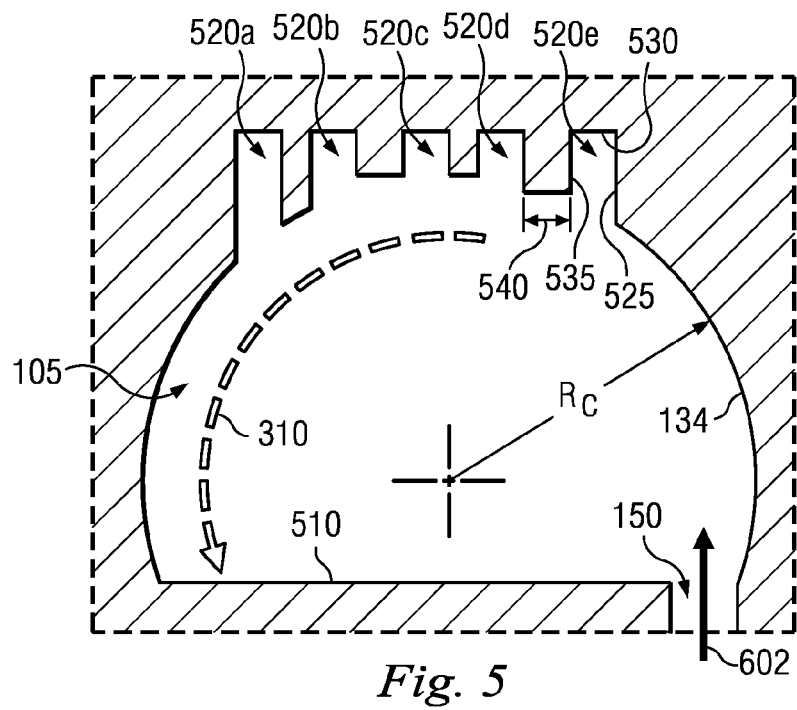
FIG. 5 illustrates an enlarged partial side sectional view of another chamber cutout, in accordance with one or more aspects of the disclosure.

FIG. 5 illustrates another embodiment of the liquid collection chamber 105. The liquid collection housing 115 may define one or more cutouts (five are shown: 520a-e) extending from the interior wall 134 outward from the liquid collection chamber 105. The cutouts 520a-e may be substantially rectangular in cross-section, having a first side 525, a second side 530, and a third side 535 that meet at approximately a 90 degree angle.

The cutouts 520a-e may each extend a depth from the interior wall 134 into the liquid collection housing 115. For example, the depth of cutout 520e may be the average length of the first and third sides 525, 535. The depth of each cutout 520a-e may be constant or may vary among the cutouts 520a-e, and, further, may be held constant in a given cutout 520a-e or vary within a given cutout 520a-e. In one or more embodiments, the depth of the cutouts 520a-e may range from about 5%, about 7%, or about 9% to about 11%, about 13%, or about 15% of the radius Rc. For example, the depth of at least one of the cutouts 520a-c may be about 10% of the radius Rc.

In one or more embodiments, the second side 530 of each of the cutouts 520a-e may be the same distance from the interior surface 510. Accordingly, the depth of each cutout 520a-e may vary around the liquid collection chamber 105. In one or more embodiments, the interior surface 510 may be a portion of the drum 111, or may be a part of the interior wall 134, or may be a separate structure.

Each of the cutouts 520a-e may be separated from an adjacent cutout 520a-e by a portion of the interior wall 134. The portion of the interior wall 134 separating each adjacent cutout 520a-e has a thickness 540 that may be uniform between each cutout 520a-e or may vary. Further, each of the cutouts 520a-e may themselves vary in thickness, i.e., the length of, for example, the second side 530 of a given cutout 520a-e, proceeding around the central axis X (FIGS. 1 and 3), which may cause the thickness 540 of the interior wall 134 portions between adjacent cutouts 520a-e to also vary. The thickness 540 may range from about 2%, about 3%, or about 4% to about 6%, about 7%, or about 8% of the radius Rc. For example, the thickness 540 may be about 5% of the radius Rc.

Referring again to FIG. 1, during operation of the separator 100, a fluid flows to the casing 107 via the separation passage 104 in a direction shown by solid arrow 600. The fluid includes a high-density component and a low-density component, it being appreciated that the description of "high" and "low" is relative between the two components and may encompass any density range. Either or both of the first and second components may include gases, liquids, and/or particles of solids, such as dirt, sand, gravel, metal, or the like. For example, the fluid may include a liquid and a gas, two or more liquids having two or more different densities, or two or more gases having two or more different densities.

In one or more embodiments, the fluid flows through the drum 111 via the separation passage 104. If provided, the rotary mechanism 109 rotates the shaft 106, and thus the drum 111, around axis X, thereby separating the fluid into a high-density flow 602 and a low-density flow 604. The high-density flow 602 may include some or all of the high-density component of the fluid, along with a portion of the low-density component. The rotation of the drum 111 causes the high-density flow 602 to proceed radially outward through the entrance 150, as shown. The low-density flow 604 may include the remaining portion of the low-density component and substantially none of the high-density component, and, in one or more embodiments, includes a large portion of the low-density component in comparison to the high-density flow 602. After the high-density flow 602 is separated out, the low-density flow 604 proceeds out of the separator 100 for use in other systems (not shown).

Referring now additionally to FIG. 2, upon entering the entrance 150, the high-density flow 602 passing therethrough may have radial, axial, and circumferential velocity components. Accordingly, as the high-density flow 602 enters the liquid collection chamber 105 via the entrance 150, it may be directed to the interior wall 134. The high-density flow 602 may continue along the interior wall 134, which may cause a vortex, as shown by arrow 210. The vortical trajectory of the flow 210 may separate the high-density component from the low-density component of the high-density flow 602 and direct the high-density component outward, forcing it against the interior wall 134, while the low-density component continues swirling in the vortex.

Referring now additionally to FIG. 5, when the flow of the high-density component comes into contact with one of the cutouts 138a-c (FIGS. 1 and 2) and/or 520a-e (FIG. 5), it may be deflected by the edge 420, or the third side 535, depending on the embodiment. This may "arrest" (i.e., stop, obstruct, or otherwise intersect or partially intersect) the vortical trajectory of the high-density component, which may then be directed in a circumferential direction (i.e., around axis X of FIGS. 1 and 3) until received by the drain 132. When the separated higher-density component is in the cutouts 138a-c and/or 520a-e, the turbulent vortical flow 210 of the undeflected low-density component may pass over the high-density component received in the cutouts 138a-c and/or 520a-e. Thus, the vortical flow of low-density component may avoid disturbing the separated high-density component, thereby minimizing the potential for splashing. Avoiding splashing may substantially avoid re-introduction of the high-density component back through the entrance 105, thereby increasing efficiency.

Figure 6:
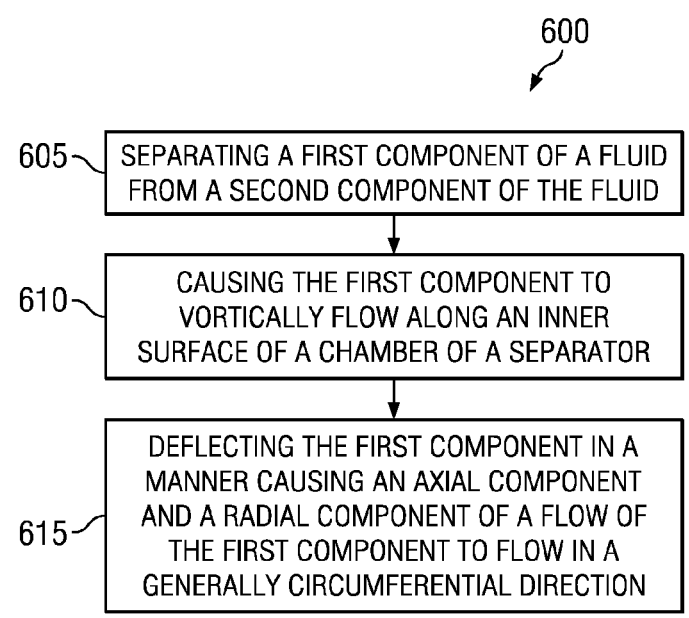
FIG. 6 illustrates a flowchart of a method for separating a first component of a fluid from a second component of the fluid, in accordance with one or more aspects of the disclosure.

FIG. 6 shows a flowchart for a method 600 for separating a first component of a fluid from a second component of the fluid, wherein the first component has a higher density compared to the second component. The method 600 may include separating a portion of the first component of the fluid from a portion of the second component of the fluid, as at 605. The separation may take place in a separator, such as separator 100 shown in FIG. 1. The method 600 may proceed to 610, which includes directing the separated first component of the fluid to a chamber such that the first component is caused to flow vortically along an inner wall defining the chamber. In an exemplary embodiment, the chamber may be the liquid collection chamber 105 shown in FIG. 1. Proceeding to 615, the method 600 may include deflecting the first component of the fluid in the chamber such that an axial component and a radial component of a flow of the first component flow in a generally circumferential direction, wherein the deflecting is performed utilizing a cutout extending generally radially from the inner surface.

Embodiments of the present disclosure may facilitate the orderly re-direction of liquids or other high-density components of a flow from an entrance of a liquid collection chamber to a tangential drain. These embodiments may be used to facilitate high-velocity liquid separation and collection, which is common in rotary separation systems. In one or more embodiments, the above-described cutouts 138a-c, 520a-e may promote smooth complementary low-density component (e.g., gas) flow in the liquid collection chamber 105, allowing a separated high-density component to form a smooth surface on cutouts 138a-c and/or 520a-e. As such, turbulent gas flow may not disturb the separated high-density component, thus reducing splashing within the liquid collection chamber 105.

It will be appreciated that although the features of the present disclosure have been described in the context of a rotary separator, this context is not necessarily to be considered limiting. In one or more embodiments, the separator 100 may be any type of centrifugal separator adapted to separate substances having relatively high densities, such as liquids, from a pressurized flow stream, such as a natural gas flow stream. For example, the separator 100 may be a static separation device, such as an inertial separator, a cyclonic separator, a swirl tube, a driven rotary separator, a self-propelled rotary separator, a centrifuge, or the like.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A collection apparatus for a separator, comprising a housing at least partially encircling a flow separation passage and defining a chamber and a cutout, the chamber being in fluid communication with the flow separation passage to receive a separated flow therefrom, and the cutout extending outward from the chamber to at least partially deflect the separated flow, wherein:

the housing is stationary and at least partially encircles a rotating shaft of the collection apparatus, an interior wall of the stationary housing at least partially defines the chamber and the cutout, and further defines an entrance along an inner annular portion of the chamber, the cutout extends from an outer annular portion of the chamber, the inner annular portion of the chamber is disposed radially between the outer annular portion and the rotating shaft, and the cutout comprises:

a first side of the interior wall of the stationary housing and a second side of the interior wall of the stationary housing, the first side and the second side extending outward from the chamber, the first side and the second side connected to each other at a point on the interior wall of the stationary housing, and the interior wall of the stationary housing defining an acute angle at the point of connection of the first side and the second side on the interior wall of the stationary housing, the acute angle being measured between the first side and the second side.

2. The collection apparatus of claim 1, wherein the chamber is substantially toroidal and disposed around a centrifugal separation zone of the separator.

3. The collection apparatus of claim 2, wherein the centrifugal separation zone comprises a rotatable drum.

4. The collection apparatus of claim 2, further comprising a drain coupled to the stationary housing and being in fluid communication with and tangentially disposed with respect to the chamber.

5. The collection apparatus of claim 2, wherein the interior wall of the stationary housing is substantially tubular.

6. The collection apparatus of claim 5, wherein the cutout comprises a plurality of cutouts spanning a cord of the interior wall, the cord having a length of from about 50% to about 100% of a diameter of the interior wall.

7. The collection apparatus of claim 5, wherein the interior wall further defines a second cutout, the second cutout comprises a third side of the interior wall of the stationary housing and a fourth side of the interior wall of the stationary housing.

8. The collection apparatus of claim 7, wherein the first and third sides meet at the interior wall to form a corner.

9. The collection apparatus of claim 1, wherein the first side is arcuate.

10. The collection apparatus of claim 9, wherein:
the first side extends from the interior wall at an angle of from about 5 degrees to about 15 degrees and extends a length of from about 50% to about 70% of a radius of the chamber; and
the second side is substantially free from curvature in a radial direction and extends a length of from about 5% to about 15% of the radius.

11. The collection apparatus of claim 1, wherein the chamber is toroidal and extends circumferentially about the flow separation passage.

* * * * *